United States Patent [19]

Casey et al.

[11] Patent Number: 4,656,501
[45] Date of Patent: Apr. 7, 1987

[54] IMAGE TRANSITION DETECTOR

[75] Inventors: Robert F. Casey, Oradell; Kirk A. Law, East Windsor, both of N.J.

[73] Assignee: RCA Corporation, Princeton, N.J.

[21] Appl. No.: 793,644

[22] Filed: Oct. 31, 1985

[51] Int. Cl.⁴ .............................................. H04N 9/78
[52] U.S. Cl. ....................................... 358/31; 358/36
[58] Field of Search ..................... 358/31, 36, 37, 329, 358/105

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,149,181 | 4/1979 | Burdick et al. | 358/31 |
| 4,178,609 | 12/1979 | Beutel | 358/31 |
| 4,241,363 | 12/1980 | Maeyama et al. | 358/31 |

OTHER PUBLICATIONS

J. P. Rossi, "Digital TV Comb Filter with Adaptive Features", Conference: Proceedings of the Conference on Video and Data Recording, Birmingham, England (20-22 Jul. 1976).

Arthur Kaiser, "Comb Filter Improvement with Spurious Chroma Deletion", *SMPTE Journal*, Jan. 1977, vol. 86, No. 1, pp. 1-5.

Primary Examiner—Michael A. Masinick
Attorney, Agent, or Firm—Paul J. Rasmussen; Eric P. Herrmann; David N. Caracappa

[57] ABSTRACT

A transition detector is disclosed which compares comb filtered component signals from adjacent image lines. A detector detects signals in the band of frequencies normally occupied by color representative information for a given line and two adjacent lines. A control signal generator generates a control signal in response to the relative levels of the detected signals for the given line, and the lines adjacent the given line. The composition of the comb filtered component signal coupled from the comb filter to the component processing channel is altered in response to the generated control signal.

9 Claims, 4 Drawing Figures

IMAGE TRANSITION DETECTOR

The present invention relates to an image transition detector for use in a video signal processor including a comb filter.

Video signal processors use comb filters to separate luminance and chrominance components from composite video signals. Comb filters compare adjacent lines to perform the separation. In the case of a line delay comb filter, the lines compared are one horizontal line period apart. In the case of a field delay comb filter, the lines compared are one field, or 263 line periods apart. In the case of a frame delay comb filter, the lines compared are one frame, or 525 line periods apart.

In each of these cases, the lines compared are separated by an odd number of horizontal line periods. In the absence of any transition in the image information, the brightness representative information is the same in both compared lines. Also, in the absence of any such transition, the amplitude of the color subcarrier carrying the color representative information will remain the same and the phase will change by 180° between the compared lines. Consequently, if the two lines are added, the color subcarrier will be canceled, leaving only the luminance component. If the two lines are subtracted, the luminance component will be canceled leaving only the color subcarrier containing the chrominance component.

If, however, there is a transition in the image information between the compared lines, then the separation will be imperfect. If, for example, a chrominance transition occurs, some color representative information will be present in the comb filtered luminance signal. If on the other hand a luminance transition occurs, some brightness representative information will be present in the comb filtered chrominance signal (beyond the vertical detail information which normally appears there.) It is desirable to detect image transitions and to correct the comb filtered component signals, eliminating the information from the other comb filtered component signals.

Some prior art comb filter circuits detect imperfect separation by calculating the cross-correlation between the comb filtered luminance and chrominance signals. If the cross-correlation exceeds a given threshold, then it is assumed that some color representative information is in the comb filtered luminance signal. In such a case, the frequency composition of the comb filtered luminance signal is altered to eliminate the color representative information. The usual alteration is to switch a filter circuit into the signal path to filter out the relatively high frequency portion of the comb filtered luminance signal, the portion normally occupied by the color representative information. This frequency altered comb filtered luminance signal is coupled to the luminance processing channel. U.S. Pat. No. 4,241,363 entitled "Comb Filter Circuit" issued Dec. 23, 1980 to Maeyama et al. is an example of such a comb filter circuit.

In accordance with the principles of the present invention, it is determined that at a chrominance transition, the comb filtered luminance signal has a color subcarrier signal component in it. The color subcarrier is completely canceled from the comb filtered luminance signal otherwise. Thus, a chrominance transition is characterized by a line of comb filtered luminance signal having a color subcarrier component between two lines with no such component. At a luminance transition involving high horizontal detail (such that the frequency of the brightness representative information is in the band of frequencies normally occupied by the color representative information) the comb filtered chrominance signal has some of the brightness representative information in it. Thus, in a similar manner, the luminance transition is characterized by a line of comb filtered chrominance signal with a brightness representative component between two lines with no such component.

In accordance with the principles of the present invention, an image transition detector compares one of the comb filtered component signals from adjacent line intervals. A signal detector detects signals in the band of frequencies normally occupied by color representative information for a given line and two lines adjacent to the given line. A control signal generator generates a control signal in response to the relative levels of the detected color representative signals for the given line, and the adjacent lines. The composition of the comb filtered component signal coupled from the comb filter to the component processing channel is altered in response to the generated control signal.

Figure 1:
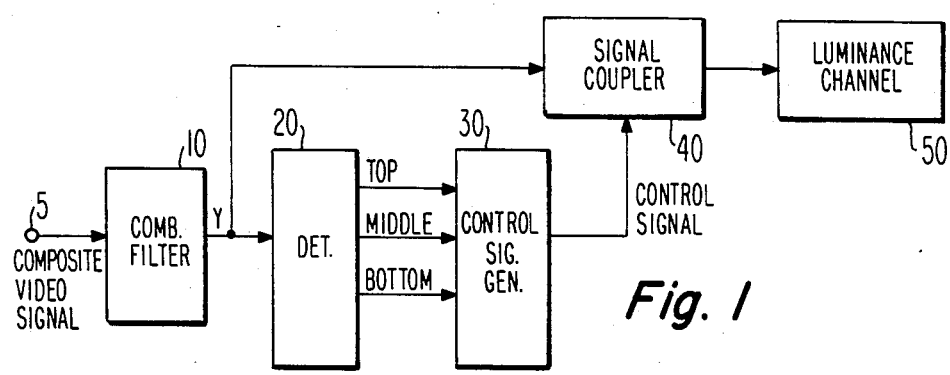
FIG. 1 is a block diagram of a video signal processor embodying an image transition detector according to the present invention.

In FIG. 1, a composite video signal from, for example, the front end of a standard color television receiver (not shown), is applied to a terminal 5. The signal at terminal 5 is supplied to a line delay comb filter 10. Comb filter 10 comprises, for example, a one horizontal line delay circuit and an adder coupled to the input and output of the delay circuit, for producing at the sum output the comb filtered luminance signal Y. The comb filtered luminance signal Y is applied to a signal detector 20 and a signal coupler 40. Signal coupler 40 couples the comb filtered luminance signal Y from the comb filter 10 to a luminance processing channel 50. The outputs of signal detector 20, representing top, middle and bottom adjacent lines, are coupled to control signal generator 30, and the output of control signal generator 30 is coupled to signal coupler 40. It will be understood that signal coupler 40 has incorporated within it matching delay circuits to align in time the comb filtered luminance signal with the control signal from control signal generator 30. The signal coupler 40 alters the composition of the comb filtered luminance signal in a manner exemplified by the above-mentioned U.S. Pat. No. 4,241,363 (Maeyma) in response to a control signal.

Assume that an image represented by the video signal contains an upper region of one color and a lower region of a different color. The color subcarrier in the upper region will have an amplitude and phase angle (with respect to a given axis) representing the color of the upper region. The amplitude and phase angle of the subcarrier in the lower region will be different from those in the upper region, representing the different color.

The subcarrier phase angle for two adjacent lines both of which are in the upper region will differ by 180°. When these two lines are summed in the comb filter, the color subcarrier will be completely canceled. The same is true for two adjacent lines both of which are in the lower region. At the transition between the top and bottom regions, a line from the top region is summed with the adjacent line from the bottom region in the comb filter. The amplitudes of the subcarrier of the transitional lines will in general be different. In addition, the phase angles of the subcarrier with respect to the given axis of the transitional lines are different, thus, the difference in phase angles between the two lines will not be 180°. Consequently, the subcarrier will not be completely canceled when the two lines are summed, and some signal in the vicinity of the color subcarrier frequency containing color representative information will remain in the comb filtered luminance signal at the transition.

Detector 20 generates signals which represent the levels of signals in the band of frequencies in the vicinity of the color subcarrier frequency for three adjacent lines. If the middle line contains such signals but the two adjacent lines do not, the control signal generator 30 generates the control signal.

Figure 2:
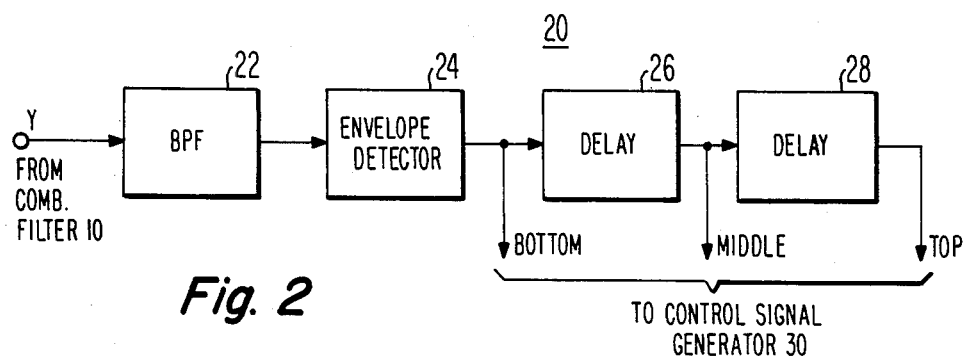
FIG. 2 is a block diagram of a signal detector which may be used in the image transition detector of FIG. 1.

FIG. 2 illustrates a signal detector 20 which may be used in the image transition detector illustrated in FIG. 1. The comb filtered luminance signal Y from comb filter 10 is supplied to bandpass filter 22. Bandpass filter 22 passes frequencies in the vicinity of the color subcarrier, i.e. those frequencies which normally contain color representative information. The output of bandpass filter 22 is coupled to an input of an envelope detector 24 which includes a threshold detector. The output of envelope detector 24 is coupled to a delay line consisting of the cascade connection of delay circuits 26 and 28.

The output of bandpass filter 22 will resemble a sinusoid at the approximate frequency of the color subcarrier. Envelope detector 24 digitizes the output of bandpass filter 22. Whenever the amplitude of the sinusoidal signal from bandpass filter 22 exceeds the threshold level, envelope detector 24 outputs a '1', otherwise it outputs a '0'. The output of envelope detector 24 is a digitized signal representing the level of color representative information of the signal applied to filter 22. Delay circuits 26 and 28 each delay signals applied to their respective inputs by one horizontal line period. The ouptut of delay circuit 28 and the output of delay circuit 26 are designated the top and middle lines respectively, and the output of envelope detector 24 is designated the bottom line of three successive adjacent image lines.

Figure 3:
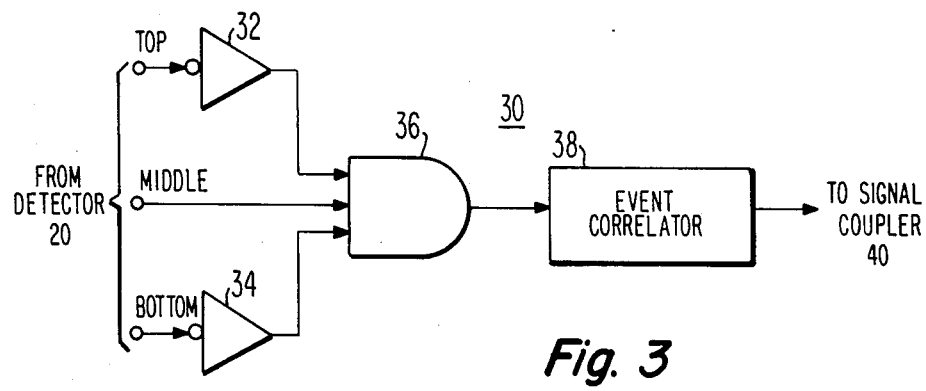
FIG. 3 is a diagram partially in block form and partially in logic schematic form of a control signal generator which may be used in the image transition detector of FIG. 1.

FIG. 3 illustrates a control signal generator which may be used in conjunction with the signal detector 20 illustrated in FIG. 2. The signals representing the level of the color representative information for the top and bottom lines from signal detector 20 are coupled to inverters 32 and 34 respectively. The signal representing information for the middle line from signal detector 20 is coupled to one input of AND gate 36. The outputs of inverters 32 and 34 are coupled to other respective inputs of AND gate 36. The output of AND gate 36 is coupled to an event correlator 38. The output of event correlator 38 is coupled to signal coupler 40 of FIG. 1.

If there is no color representative information in the top and bottom lines, then the inputs to inverters 32 and 34 are '0'. The outputs of inverters 32 and 34 are '1' only if their inputs are '0', meaning that the level of color representative information for the top and bottom lines are both below the predetermined threshold. The output of AND gate 36 will be a sequence of '1's only when the middle line has color representative information and the top and bottom lines have no color representative information.

The color representative information represented by the color subcarrier has a limited bandwidth compared to that of the luminance information. (For example, in the NTSC system, the I bandwidth is 1.5 MHz and the Q bandwidth is 0.5 MHz while the Y bandwidth is 4.2 MHz.) The sequence of '1's at the output of from AND gate 36 must last for an amount of time sufficient to properly represent events of such limited bandwidth. Thus, event correlator 38 is required. Event correlator 38 looks for a predetermined number of '1's from AND gate 36. This known pattern is detected by event correlator 38 as a valid indication of a chrominance transition. If this number of successive '1's is detected, event correlator 38 generates the control signal supplied to signal coupler 40. An exemplary event correlator is described in U.S. Pat. No. 4,061,976 entitled "Receivers for Pulses of Different Widths" issued Dec. 6, 1977 to Sugai; see in particular the apparatus illustrated in FIG. 18 and described in the corresponding text.

A continuously varible control signal may also be generated. One extreme condition indicating a chrominance transition occurs when the color representative information in the comb filtered luminance signal representing the middle line is at its maximum, and that for the adjacent lines is zero. In this case, signal coupler 40 should supply a fully filtered comb filtered luminance signal to the luminance signal processor 50.

The other extreme condition indicating no chrominance transition occurs when the same information in the vicinity of the color subcarrier is in all of the three compared lines. In this case, signal coupler 40 should supply a full bandwidth comb filtered luminance signal to luminance signal processor 50. In between these two extreme conditions, the comb filtered luminance signal coupled to the luminance processing channel by signal coupler 40 can be somewhere between the fully filtered and unfiltered signals supplied in the extreme conditions discussed above.

Signal coupler 40 may be constructed to respond to a control signal which is continuously variable between two extreme levels. In response to one extreme level of control signal, a fully filtered comb filtered luminance signal is coupled to luminance processing channel 50. In response to the other extreme level of control signal a full bandwidth comb filtered luminance signal is coupled to luminance processing channel 50. In response to levels of control signal between these two extremes, a combination of fully filtered and full bandwidth comb filtered luminance signal, with the proportion of each determined by the level of the control signal, is supplied to luminance processing channel 50. An example of such a signal coupled is described in U.S. Pat. No. 4,149,181 entitled "Signal-Dependent Chrominance Subcarrier Filtering Circuit" issued Apr. 10, 1979 to Burdick et al.; see particularly FIG. 1, elements 40 through 46 and the associated text in column 3, lines 4 through 15.

Figure 4:
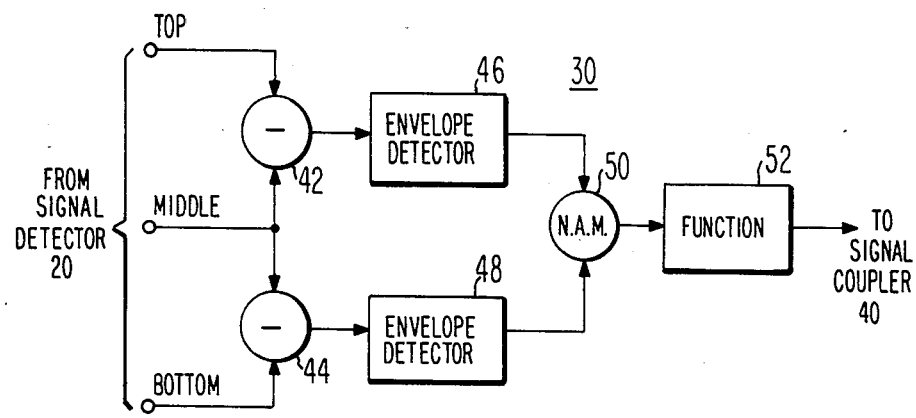
FIG. 4 is a block diagram of an alternative control signal generator which may be used in the image transition detector of FIG. 1.

FIG. 4 illustrates a control signal generator 30 which generates a continuously variable control signal. The signal representing the top of three adjacent lines is coupled to one input of subtractor 42; the signal representing the bottom of three adjacent lines is coupled to one input of subtractor 44; and the signal representing the middle of three adjacent lines is coupled to the other inputs of both subtractor 42 and 44 respectively. The outputs of subtractors 42 and 44 are coupled to envelope detectors 46 and 48 respectively (which do not include threshold detectors). The outputs of envelope detectors 46 and 48 are coupled to respective inputs of a minimizing non-additive mixer 50. The minimizing non-additive mixer functions to pass the signal applied to its input terminals which has the lesser magnitude. The output of minimizing non-additive mixer 50 is coupled to a function circuit 52 which produces at its output, a signal which is a function (possibly a non-linear function) of the signal at its input.

If the top, middle and bottom lines all have the same magnitude of color representative information, the outputs of both subtractors 42 and 44 and consequently both envelope detectors 46 and 48 are zero. The minimizing non-additive mixer also passes zero. This value is the value indicating no color representative information and causes the signal coupler unit to pass the full bandwidth color difference signal.

If the middle line has a high magnitude of color representative information relative to the top or bottom lines, then the outputs of the envelope detectors 46 and 48 are greater than zero. The lesser is passed through the function circuit 52 to cause some combination of non-filtered and filtered comb filtered luminance signal to be supplied to the luminance processing channel.

The image transition detector above has been described in an embodiment for detecting chrominance transitions and for correcting the comb filtered luminance component signal. It will be understood that such an image detector may also be used to detect high horizontal detail luminance transitions, and to correct the comb filtered chrominance component signal. In such a system, the comb filtered chrominance signal from the previous line is substituted for the contaminated one.

The above video signal signal processor has been described with reference to a line delay comb filter. Similar apparatus may be used with field delay or frame delay comb filters to detect chrominance transitions in accordance with the present invention.

The above embodiments may be implemented in either continuous or sample data form. Any sampled data embodiment may be implemented in either analog or digital form.

What is claimed is:

1. In a video signal processor, including a comb filter for producing a comb filtered component signal, a component processing channel, and means for coupling said comb filtered component signal to said component processing channel including means for altering the composition of said comb filtered component signal in response to a control signal; an image transition detector comprising:
 means responsive to said comb filtered component signal for detecting signals in the band of frequencies normally occupied by color representative information for a given line and two lines adjacent said given line; and
 means coupled to said detecting means for generating said control signal in response to the relative levels of said detected signals for said given line and said adjacent lines.

2. The image transition detector of claim 1, wherein said signal detecting means comprises:
 an input terminal for applying said comb filtered component signal;
 respective output terminals;
 bandpass filter means coupled between said input and output terminals for passing only signals in the band of frequencies normally occupied by color representative information to said output terminals; and
 delay means serially coupled with said bandpass filter means between said input and output terminals for producing respective signals delayed by one and two delay periods corresponding to that of said comb filter.

3. The image transition detector of claim 2, wherein said signal detecting means further comprises digitizing means coupled between said input and output terminals for producing signals at said output terminals having first and second states.

4. The image transition detector of claim 3, wherein:
 said bandpass filter means comprises a bandpass filter coupled to said input terminal for passing the band of frequencies normally occupied by color representative information;
 said digitizing means comprises a threshold detector having an input coupled to said bandpass filter having an output producing a signal having a first state when the level of the signal at said input exceeds a predetermined lelvel, and a second state otherwise; and
 said delay means comprises a delay line having an input coupled to said threshold detector, a first output for producing signals from said input delayed by one comb filter delay period, and a second output for producing signals from said input delayed by two comb filter delay periods.

5. The image transition detector of claim 4, wherein said control signal generator comprises:
 respective means coupled to said signal detector for producing a known pattern of pulses in the presence of an image transition; and
 a pattern detector coupled pattern producing means for producing said control signal when said known pattern is detected.

6. The image transition detector of claim 4, wherein said control signal generating means comprises:
 respective inverters coupled to said output of said threshold detector and said second output of said delay line; and
 an AND gate having rspective inputs coupled to said first output of said delay line, and to said respective inverters for producing said known pattern of pulses in the presence of an image transition.

7. The image transition detector of claim 1, wherein said control signal generator means comprises:
 means responsive to said detected signals for calculating the respective differences between the detected levels of said given line and of said adjacent lines; and
 means coupled to said calculating means for generating said control signal which varies as a continuous function of said differences.

8. The image transition detector of claim 7, wherein:
 said difference calculator comprises a first subtractor having a first input responsive to the detected signal for said given line, a second input responsive to the detected signal for one of said adjacent lines, and an output, a second subtractor having a first input responsive to the detected signal for said given line, a second input responsive to the detected signal for the other of said adjacent lines, and an output, and respective envelope detectors coupled to the output of said first and second subtractors; and said continuously variable control signal generating means comprises a minimizing non-additive mixer having respective inputs coupled to said respective envelope detectors, and an output, and a function circuit coupled to said output of said minimizing non-additive mixer for producing said continuously variable control signal.

9. The image transition detector of claim 1, whereins aid control signal generating means comprises means for generating said control signal when said detected signal for said given line has a relatively high signal level, and said detected signals for said adjacent lines have relatively low signal levels.

* * * * *